July 1, 1952 W. E. GORDON 2,601,778
FREE PISTON IMPULSE BLAST GAUGE
Filed Oct. 12, 1948
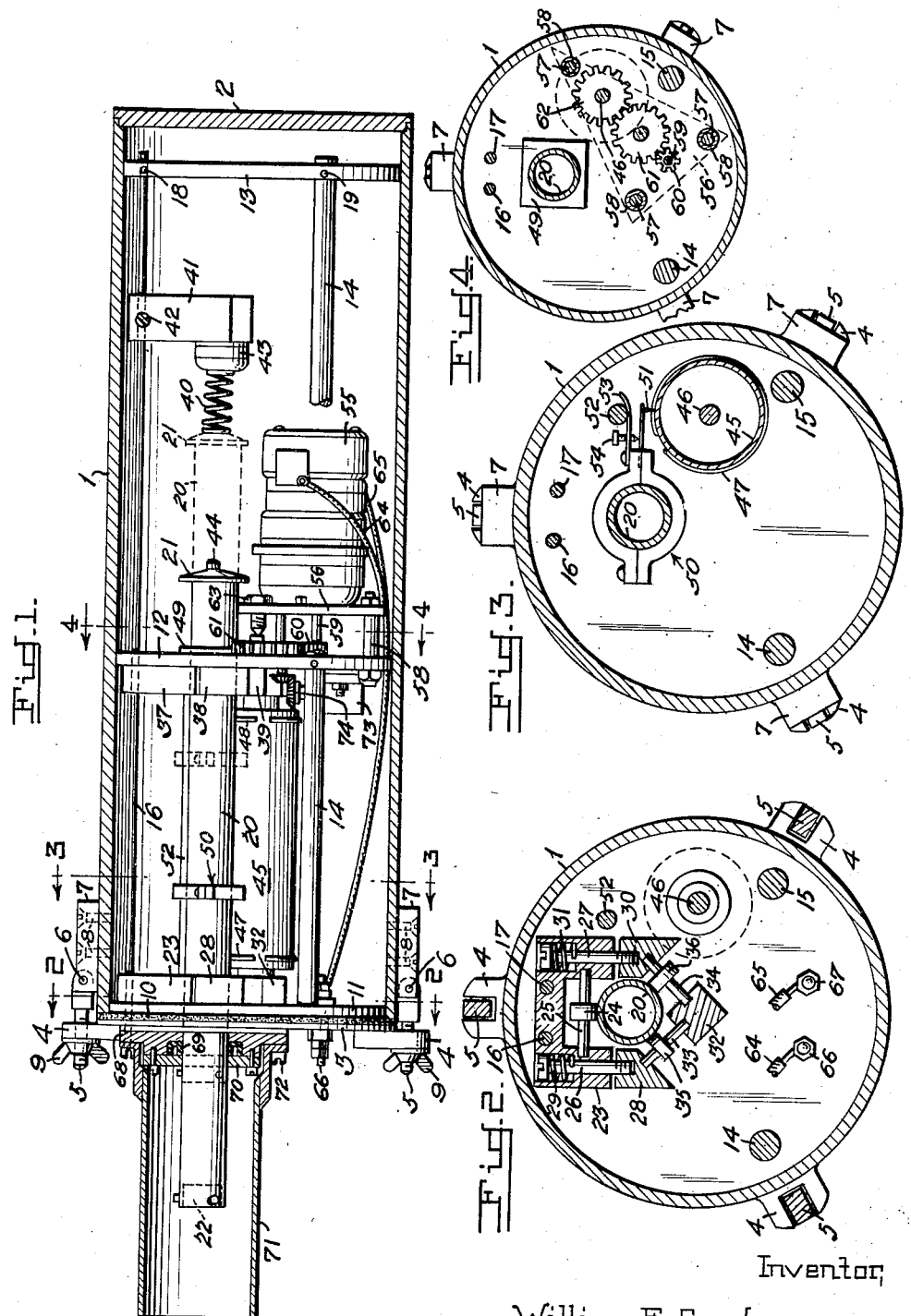
Inventor,
William E. Gordon
By G. J. Kessenich, J. H. Church + A. W. Dew
Attorneys Patented July 1, 1952

2,601,778

UNITED STATES PATENT OFFICE 2,601,778

FREE PISTON IMPULSE BLAST GAUGE

William E. Gordon, Columbia, Mo., assignor to the United States of America as represented by the Secretary of the Army Application October 12, 1948, Serial No. 54,056

5 Claims. (Cl. 73—35)

This invention relates to gauges for use in determining the destructive effects of blasts such as those created by bomb explosions. More particularly, the invention is concerned with a blast gauge of the free-impulse piston type in which one side only of a free piston is subjected to the effects of a blast and its acceleration, velocity and position at any instant following impact of the blast wave are accurately measured and interpreted to determine both the absolute and relative destructive effects of the explosion.

It is the main object of the invention to provide a gauge in which the foregoing values of accelerations, velocity, etc., at the location of the gauge may be determined readily to a high degree of accuracy and interpreted in terms of the destructive effects of the blast producing the same.

A further object is to provide a gauge as aforesaid of the free-impulse piston type wherein the piston is mounted for translation substantially without friction, whereby the characteristics of movement thereof are a true representation of the blast effects at that location.

Another object is to provide a recording mechanism whereby the aforesaid translation, velocity and acceleration of the blast-responsive element may be accurately measured and interpreted in terms of the destructive effects of the blast.

A further object is the provision of a method for rapidly and accurately determining the destructive effect of a blast at a given point thereadjacent.

A still further object is to provide a blast-testing gauge which is relatively simple and rugged in construction, easily operated in places where more complicated gauges are impossible or impracticable of use, which may be set in operation automatically at a predetermined time, and which may be used and the results interpreted by persons having relatively little technical training.

Other objects and advantages will become apparent after a study of the following disclosure including the drawing wherein:

Fig. 1 is a central longitudinal cross section taken on a plane indicated by the line 1—1, Fig. 3, and Figs. 2, 3 and 4 are cross sections taken in planes indicated by the lines 2—2, 3—3 and 4—4, respectively, of Fig. 1, Figure 4 being to a smaller scale than Figs. 2 and 3.

Referring in detail to the drawing, 1 identifies a casing, conveniently in the form of a tube section, and closed at one end by a plate 2. The other end of casing 1 is closed by a disc 3 forming one part of an assembly by which the entire gauge proper may be inserted and withdrawn as a unit. Three equally-spaced notched lugs 4 are riveted or otherwise secured to disc 3 with their notched portions extending radially from the periphery of the disc. Each notch is adapted to receive a bolt 5 pivoted as at 6, Fig. 1, to a block 7, which may be secured to casing 1 by screws 8. Thus the gauge assembly may be rigidly secured to and within the casing by turning down wing nuts 9, and as easily removed by loosening the nuts and pivoting each bolt out of its notch. The end closure of which disc 3 is a part, includes a gasket 10 which when nuts 9 are turned down, effects an air-tight seal between disc 3 and the end of casing 1.

The aforementioned assembly includes a mounted frame which includes three plates 11, 12 and 13, each shaped to have a smooth fit within casing 1. These plates are apertured at their lower portions to receive a first pair of rods 14 and 15, and at their upper portions to receive a second pair of rods 16 and 17. Each of the aforesaid rods passes through each circular plate with a snug fit and may be secured to each plate by a pin, as indicated at 18 and 19, for example, Fig. 1. The plates and rods together form a frame. Forward plate 11 is secured in any convenient manner, to closure disc 3.

The blast-responsive element comprises a piston 20 shown in the form of a hollow metallic cylinder closed by a cap 21 at its end inside casing 1, and by a block 22 at its end exterior of the casing. The piston is mounted by anti-friction means for axial translation in response to a blast wave incident upon its end exteriorly of casing 1. One suitable form of such mounting means is shown as a bracket 23 in the general form of an inverted U rigidly attached to forward plate 11 and having holes in its bight portion to accommodate rods 16 and 17. An upper ball bearing 24 is mounted upon a shaft 25 which extends between the leg portions of bracket 23.

Each leg of the aforesaid bracket is longitudinally bored to slidably receive bolts 26 and 27. A counterbore at the upper end of each bore accommodates the heads of the bolts. The lower end of bolt 26 is threaded into a generally triangular block 28. A coil spring 29 is interposed between the head of bolt 26 and the bottom of the counterbore, and acts to urge the bolt 26 and block 28 upwardly. In a similar manner, bolt 27 supports a triangular block 30 and is urged upwardly by a coil spring 31. A generally square block 32 is supported from blocks 28 and 30, by shafts 33 and 34, in the manner indicated at Fig. 2. For example, shaft 33 is fixed at one end in block 28, and at the other end in block 32. Shaft 34 is similarly mounted. As clearly shown upon Fig. 2, shafts 25, 33 and 34 are arranged along the sides of a triangle and shafts 33 and 34 carry ball bearings 35 and 36. Each of the ball bearings 24, 35 and 36 is fixed in any suitable manner against translation along its shaft. Piston 20 is mounted by and between bearings 24, 35 and 36 for almost frictionless axial translation. Because of the action of light springs 29 and 31, the bearings 35 and 36 are urged upwardly and yielding restrain the piston against lateral movement.

The rear end of piston 20 is mounted by a set of three ball bearings, not shown, since these bearings and their mountings are duplicates of the ones just described, it is deemed sufficient merely to identify bracket 37, securely attached to plate 12 and corresponding to bracket 23, one of two triangular blocks 38 corresponding to block 28, and square block 39, corresponding to block 32. In this manner piston 20 is mounted for axial translation in response to the impingement of a blast wave against its end projecting from casing 1.

The stroke of the piston 20 may be limited to any desired dimension by a buffer spring 40 supported for adjustment along the axis of the piston by a block 41 which may be mounted for adjustment on and along rods 16 and 17 and held in adjusted position thereon by a set screw 42. A retainer 43 is attached to block 41 facing piston 20, and has a recess accommodating one end of spring 40 and holding it in alignment with a pin 44 projecting from cap 21. The operation of this buffer feature will be obvious from inspection of Fig. 1. The forwardmost position of piston 20 is determined by engagement between a flange on cap 21 and a rubber pad, 49, Fig. 1, attached to the rear face of plate 12.

A hollow cylindrical record drum 45 is fixed to a shaft 46, Fig. 2, journaled in bearings, not shown, carried respectively by forward plate 11 and intermediate plate 12. A record sheet such as a wax-coated paper may be held in position about the drum, by means of spring clips such as 47 and 48, Fig. 1. The shaft 46 is parallel to the axis of piston 20.

A split collar 50, of plastic, such as methyl methacrylate, is clamped about piston 20 in a position such that, when the piston is in its forward limiting position with the flange on cap 21 in engagement with pad 49, the collar is in a transverse plane substantially coincident with the forward end of drum 45. A stylus, 51, Fig. 3, consists of a relatively stiff flat spring having a sharpened scriber projecting from one end, and having its other end secured between the two halves of collar 50. From Fig. 3 it will be noted that the stylus in substantially tangent to the top surface of drum 45 so that the scriber or recorder thereof may bear lightly upon a record sheet wound about the drum. A rod or abutment 52 extends between and is supported by plates 11 and 12. A relatively light leaf spring 53 is secured at one end to collar 50 and extends generally parallel with stylus 51. This spring bears against the underside of rod 52 with a force which may be adjusted by a screw 54 threaded in spring 53 and having its end bearing against stylus 51. By this construction, the pressure of stylus 51 on drum 45 may be adjusted while, at the same time, the piston is prevented from rotating in its bearings and is limited to translation.

Power means are provided to rotate drum 45 rapidly. This means includes a midget type 6-volt D. C. motor 55, Fig. 1, mounted by having its foward end bolted to a triangular plate 56 shown in dotted lines upon Fig. 4. Plate 56 is connected to intermediate plate 12, in rigid spaced relation therewith, by three bolts 57, and spacer sleeves 58. The shaft 59 of motor 55 projects forwardly through a hole in plate 56 and may, if necessary, have a bearing in plate 12. The end of shaft 59 carries a pinion 60 adjacent plate 12. This pinion meshes with an idler gear 61, Fig. 4, in mesh with a second gear 62 splined or otherwise non-rotatably atached to the reduced end of drum shaft 46 projecting through its bearing in plate 12. Idler 61 is conveniently secured to a stub shaft journaled at its forward end in a bearing carried by plate 12 and held against rearward movement by a cap screw 63 threaded through plate 56 and having a pointed end engaging the rear end of the aforesaid stub shaft. A series of holes may be provided in plates 12 and 56 to accommodate the shaft of gear 61 in different positions for different sizes of idlers. By this construction, motor 55 and plate 56 may be taken off by removal of bolts 57, and gears 61 and 62 replaced by gears having different pitch diameters so as to vary the gear ratio between the motor shaft and drum to suit different conditions of use. In all cases, of course, the sum of the pitch diameters of each substitute pair of gears, will be equal to the sum of the pitch diameters of gears 61 and 62. Cables 64 and 65, extend from terminals on motor 55 to lead-in terminals 66 and 67 extending through forward plate 11 and disc 3 and insulated from both. A revolution counter 73 is carried by plate 12 and driven from the shaft of gear 61 by means of bevel gears 74.

A packing gland comprises a collar 68 secured to the forward side of disc 3 concentric of piston 20. This collar is counterbored at its forward side to receive a soft leather packing element 69, held in place by a second collar 70. Collar 70 is secured to collar 68 by screws, as indicated in Fig. 1.

A tube section 71 has a flange at its rear end flush with the rim of collar 68. Cap screws 72 pass through aligned holes in the flange and collar and are threaded into disc 3 and plate 11 to rigidly unite the parts. Tube section 71 acts to prevent a side-on blow upon piston 20 from the blast and assures that the blast wave will strike the piston end-on. It also acts to prevent damage to the protruding end of the piston in handling.

In use, nuts 9 are loosened and the entire gauge is withdrawn as a unit from casing 1. A sheet of record paper is clipped about the periphery of drum 45, block 41 is adjusted for the desired maximum stroke of the piston, the instrument is replaced in casing 1 and nuts 9 are turned down. External connections are than made to terminals 66 and 67, and the instrument is mounted at the point where it is desired to investigate blast effects.

Just prior to detonation of the explosive, motor 55 is started and, as the blast wave impinges on the end of piston 20, the latter is driven rearwardly. Since drum 20 is now rotating rapidly, stylus 51 will trace a spiral curve on the record paper thereon.

The destructive effect of an explosion at any given point has been found to be closely proportional to the integral of the positive excess-pressure versus time to the point where the excess-pressure drops to zero. This value is known as the "positive impulse." Designating the excess-pressure versus time curve by P, time by $t$ and positive impulse by I max, and taking the time $t$ at which the blast wave from the explosion reaches the point under investigation as zero and T as the time at which the excess pressure goes to zero then $$I\max = \int_0^T P\,dt$$

This fundamental equation may be related to the instrument disclosed by letting $M$ = mass of piston 20
$A$ = area of end of piston subject to the blast
$S$ = distance piston has traveled from its initial rest position at any time $t$ Then $$I = \int_0^t P\,dt \quad (1)$$

$$D = \int_0^t I\,dt = \int_0^t \int_0^t P\,dt^2 \quad (2)$$

From the fundamental laws of motion—

$$M\frac{d^2S}{dt^2} = AP \quad (3)$$

Integrating this expression once and solving for $$\frac{dS}{dt}, \frac{dS}{dt} = \frac{A}{M}\int_0^t P\,dt = \frac{AI}{M} \quad (4)$$

Integrating (4), $$S = \frac{A}{M}\int_0^t I\,dt = \frac{AD}{M}$$

Since A and M are constants of the instrument, the actual distance versus time curve obtained upon the surface of drum 20 is directly proportional to D. The slope of the curve at any point, that is $dS/dt$ is seen from Equation 4 to be proportional to the impulse I. The maximum slope is proportional to I max and the time at which this maximum occurs is T.

In practice the slope may be obtained by the use of a tangentimeter or by measuring successive values of S and computing the average value of the slope over small intervals of time. From Equation 3 it is clear that the second derivative of S, or the curvature, is proportional to P. The measurement of pressures from the average curvature of S is possible with good results when the duration of the pressure pulse is long.

Piston 20 may be made of aluminum tubing one inch in diameter with a wall thickness of $\frac{1}{32}''$. Both ends are, of course, completely closed. The mass M of the piston may be varied over a wide range, to suit different conditions of use, by substituting end plugs in piston 20 of different metals and weights; or the mass M may be varied by substituting solid aluminum or solid steel pistons. Numerous other ways to effectively alter the mass will occur to those skilled in the art. Motor 55 may rotate at about 3000 R. P. M., which with a 3:1 reduction gear ratio, gives a drum speed of about 1000 R. P. M. Drum 45 may have a diameter of 2'' and a length of 6''. Counter 73 makes it possible to check the drum speed with a stop watch, a short time before the gauge is to be used. Motor 55 incorporates a speed governor and in actual use the speed has been found to vary less two per cent over long periods of use. For air blast measurements the gauge is preferably mounted so that the piston is at approximately right angles to the direction of the blast, that is, edge-on.

Gauges constructed according to the present disclosure give results which are comparable in accuracy to piezoelectric or similar type gauges. Moreover, they possess certain advantages over electrical gauges, such as greater simplicity of construction and operation, trouble free operation over a long period of use and absence of critical adjustments. Furthermore, gauges of the free-piston impulse type may be used in remote localities where high voltage current is not available; and they may be used in connection with a time-controlled switch in the circuit of motor 55, to operate at any given time even although unattended. Gauges so constructed have also been used with good results to measure impulse versus time curves from charges detonated inside concrete buildings. In such cases, the gauge is preferably mounted upon the outside of a wall of the building by removing tube 71 and bolting front plate 11 to a flange on a pipe set in the wall and communicating with the interior of the building.

I have thus provided a gauge which may be used by one with relatively little technical training to determine the maximum excess pressure, the time at which said excess pressure drops to zero, the second integral of the pressure-time versus time curve, the impulse versus time curve, and the pressure versus time curve. While, to comply with the requirements of the patent statutes, I have disclosed a specific form of the invention, together with a recitation of definite dimensions and materials, such should be taken by way of example only and not in a limiting sense. Numerous modifications and substitutions of equivalents will occur to those skilled in the art, after a study of the present disclosure and it is my desire and intention to reserve all such changes as fall within the scope of the subjoined claims.

Having fully disclosed the invention, what I claim and desire to secure by Letters Patent is:

1. A blast testing instrument comprising a closed casing, an elongated cylindrical piston extending through an opening in one wall of said casing, anti-friction bearing means in said casing mounting said piston for axial translation, gland means sealing the space between said opening and said piston to thereby render said casing air tight, a record drum journaled in said casing with its axis parallel to said piston, constant speed power means in said casing connected to rotate said drum, a stylus comprising a first leaf spring connected at one end to said piston and extending radially thereof, the other end of said stylus having a scriber adapted to engage the surface of said drum, an abutment rod fixed in said casing parallel with and adjacent said drum, a second leaf spring secured at one end to said piston and engaging said rod to thereby yieldingly urge said scriber into contact with said drum, and adjustable means urging said springs apart to thereby vary the pressure of said scriber upon said drum, said springs acting to prevent rotation of said piston.

2. In a blast testing gauge, a frame comprising first and second plates, means secured to said plates and uniting the same in spaced parallel relation, said plates having aligned openings, a cylindrical elongated impulse piston extending through said openings, anti-friction bearing means carried by said plates and mounting said piston for axial translation, a recording drum journaled between said plates for rotation upon an axis parallel with said piston, a motor carried by said second plate, gear means connecting said drum to said motor for rotation thereby, a collar fixed to said piston, a stylus extending from said collar into contact with the periphery of said drum, an abutment rod fixed to said plates parallel with said drum, spring means carried by said collar and slidably engaging said rod to urge said stylus into engagement with said drum, a casing, said plates having a smooth fit within said casing to locate the gauge therewithin, one end of said piston extending through an aperture in the wall of said casing, and a packing gland surrounding said aperture and making a pressure-tight seal with the cylindrical wall of said piston.

3. In an instrument for measuring the pressure-time characteristics of a bomb blast, first and second mounting plates connected in spaced parallel relation normal to a common axis, an elongated cylindrical impulse piston extending through aligned apertures in said plates, bearing means carried by said plates and supporting said piston for axial translation parallel with said axis, each said bearing means comprising an inverted U-shaped bracket secured to a respective one of said plates, a first shaft secured in and between the depending legs of said bracket, second and third shafts connected in fixed angular relation, means mounting said second and third shafts for movement as a unit toward and from, and in a common plane with, said first shaft, the axes of all said shafts defining a triangle, means urging said second and third shafts in said plane toward said first shaft, a roller journaled on each shaft, said rollers engaging the periphery of said piston at circumferentially-spaced points thereabout, a casing having an aperture in one wall and through which said piston extends, sealing means effecting gas-tight contact between said casing and piston, and time-controlled recording means in said casing responsive to axial translation of said piston relatively to said casing.

4. The instrument recited in claim 3, said recording means including a recording drum, means mounting said drum for rotation on an axis parallel with said piston, a motor carried by one said plate, a driving connection between said motor and drum, a stylus fixed to said piston and adapted to contact a recording surface of said drum, a shaft parallel with said drum, and a spring arm carried by said piston and engaging said shaft to prevent rotation of said piston and urge said stylus into engagement with said drum.

5. The instrument recited in claim 4, all said mounting plates, piston, drum and motor being removable from said casing as a unit.

WILLIAM E. GORDON.

REFERENCES CITED

The following references are of record in the file of this patent:

UNITED STATES PATENTS

| Number | Name | Date |
| --- | --- | --- |
| 342,351 | Haagensen et al. | May 25, 1886 |
| 391,392 | Spiller | Oct. 16, 1888 |
| 1,013,479 | Elliott et al. | Jan. 2, 1912 |
| 1,063,281 | Motherwell | June 3, 1913 |
| 1,263,165 | Vincent | Apr. 16, 1918 |
| 1,280,354 | Zigler et al. | Oct. 1, 1918 |
| 1,846,048 | Desauteis | Feb. 23, 1932 |
| 2,265,098 | Bettis | Dec. 2, 1941 |
| 2,308,582 | Beale | Jan. 19, 1943 |